United States Patent [19]

Ryoke et al.

[11] Patent Number: 4,803,121

[45] Date of Patent: Feb. 7, 1989

[54] MAGNETIC RECORDING MEDIUM

[75] Inventors: Katsumi Ryoke; Masatoshi Takahashi; Toshimitu Okutu; Hideaki Kosha, all of Kanagawa, Japan

[73] Assignee: Fuji Photo Film Co., Ltd., Kanagawa, Japan

[21] Appl. No.: 109,013

[22] Filed: Oct. 16, 1987

[30] Foreign Application Priority Data

Oct. 16, 1986 [JP] Japan .................. 61-244034

[51] Int. Cl.$^4$ .................................. G11B 5/70
[52] U.S. Cl. .................... 428/329; 428/694; 428/900
[58] Field of Search ............ 428/328, 329, 331, 694, 428/900

[56] References Cited

U.S. PATENT DOCUMENTS

| | | | |
|---|---|---|---|
| 4,238,341 | 12/1980 | Kato | 428/329 |
| 4,584,243 | 4/1986 | Kadokura | 428/403 |
| 4,590,127 | 5/1986 | Hashimoto | 427/215 |
| 4,652,500 | 3/1987 | Ejiri | 428/329 |
| 4,670,337 | 6/1987 | Tokuda | 428/329 |
| 4,671,993 | 6/1987 | Kadokura | 428/329 |

*Primary Examiner*—Paul J. Thibodeau
*Attorney, Agent, or Firm*—Sughrue, Mion, Zinn, Macpeak & Seas

[57] ABSTRACT

A magnetic recording medium is disclosed, comprising a non-magnetic support having thereon a magnetic layer comprising ferromagnetic fine particles, a binder, and α-alumina particles having an average size of from about 0.1 to 0.3 μm, provided that the number of α-alumina particles having a particle size of larger than 0.05 μm is at least equal to the number of α-alumina particles having a particle size of up to 0.05 μm.

10 Claims, No Drawings

MAGNETIC RECORDING MEDIUM

FIELD OF THE INVENTION

The present invention relates to a magnetic recording medium, and more particularly it relates to a magnetic recording medium comprising a non-magnetic support having provided thereon a magnetic layer containing an abrasive agent.

BACKGROUND OF THE INVENTION

In a coated magnetic recording medium, i.e., a so-called coated type magnetic recording medium comprising a non-magnetic support having provided thereon a magnetic layer containing ferromagnetic fine particles and a binder, an abrasive agent has been added to the magnetic layer to improve its magnetic characteristics. Improvements of durability of a magnetic recording medium, improvements of squareness ratio, reduction of the coefficient of friction adjustments of the decrease of reproduced outputs as well as head wear have been attained by the addition of the abrasive agents, as disclosed in U.S. Pat. No. 3,630,910. Suitable abrasive agents are fine particles having a Mohs' hardness of 6 or more and having an average particle size of 3.0 μm or less. Specific examples thereof include α-alumina, silicon carbide, chromium oxide, cerium oxide, corundum, artificial diamond, α-iron oxide, garnet, emery (main component: corundum and magnetite), silica, silicon nitride, boron nitride, molybdenum carbide, titanium carbide, titanium oxide, etc. These abrasive agents are disclosed in U.S. Pat. Nos. 3,687,725, 3,007,807 and 3,041,196, British Patent No. 1,145,349 and German Patent No. 853,211.

When α-alumina having an optional particle size (e.g., 0.005 μm to 5.0 μm) is used as an abrasive agent in a magnetic layer, the gloss of the magnetic layer is inferior to that of a magnetic layer containing the other abrasive agents, thereby decreasing CS/N ratio (i.e., color S/N or chroma S/N) and a resulting magnetic recording medium become poor for practical use. However, incorporation of alumina into a magnetic layer has the advantage that the magnetic layer hardly impairs the running system, e.g., magnetic head is not worn. Therefore, many attempts have been made to put α-alumina into practical use, without the above described disadvantage (e.g., decrease of the CS/N ratio).

As a result of extensive researches to improve the performance of α-alumina, it has now been found that the disadvantages are caused by the presence of fine particles thereof.

SUMMARY OF THE INVENTION

An object of the present invention is to improve dispersibility of α-alumina in a magnetic recording layer.

Another object of the present invention is to increase the S/N ratio of a magnetic recording medium.

A further object of the present invention is to reduce magnetic head wear caused by a magnetic recording medium.

It has now been found that these and other objects of the present invention can be attained by a magnetic recording medium comprising a non-magnetic support having thereon a magnetic layer comprising ferromagnetic fine particles, a binder, and α-alumina particles having an average particle size of from about 0.1 to 0.3 μm, provided that the number of α-alumina particles having a particle size larger than 0.05 μm is at least equal to the number of α-alumina particles having a particle size of up to 0.05 μm.

DETAILED DESCRIPTION OF THE INVENTION

The size (as a diameter of the corresponding Spheres) of α-alumina particles used as an abrasive agent in the present invention is from about 0.005 to 1 μm. That is, the average size of the α-alumina particles is within the range of from 0.1 to 0.3 μm. The coefficient of variation (the standard deviation $\sigma$/average value $\bar{x}$) of the size of α-alumina particles is from 0.35 to 0.55. The average particle size is measured by an electron-microscope and, in many cases, cannot be directly determined in view of various shapes of particles. Therefore, to determine particle size the projected area of particles is converted into that of a corresponding sphere, and the term "particle size" as used herein refers to the diameter of the corresponding sphere.

Fine particles of an abrasive agent have poor dispersibility in the magnetic coating composition and/or a magnetic layer and do not efficiently function as an abrasive agent. For this reason, as the amount of small particles is reduced, the dispersibility improves. In view of this fact, it is necessary in the present invention that the number of α-alumina particles having a particle size of 0.05 μm or less (hereinafter referred to as "small particles") does not exceed the number of α-alumina particles having a particle size of more than 0.05 μm (hereinafter referred to as "large particles"). That is, the number of small particles having a particle size of 0.05 μm or less must be less than or equal to the number of large particles having a particle size of more than 0.05 μm. Preferably the number of small particles is at most half the number of large particles, and more preferably the number of small particles is at most one third the number of large particles. That is, when X is the number of particles having a particle size of 0.05 μm or less and Y is the number of particles having a particle size of more than 0.05 μm, $X \leq Y$, preferably $2X \leq Y$, and more preferably $3X \leq Y$. In this case, it is technically difficult to measure the number of particles, and the number of particles is generally measured by an electron-microscope or by a method of centrifugal sedimentation as described in Fairs, G. L., *J. Soc. Chem. Ind.*, 62, p. 374 (1943), Atherton, E., *Nature*, 17, p. 350 (1953), *Instruction for Use of the Particle Size Analyzer TGZ*-3, Carl Zeiss Co., Ltd.

The α-alumina particles used in the present invention can be prepared by the Bayer's process, a modified Bayer's process or by an organic aluminum method as described in *KAGAKU BINRAN (application)*, edited by Japan Chemical Society, revised third edition, p. 281 (1980), *The Royal Institute of Chemistry* (1957), T. G. Pearson, *The Chemical Background of the Aluminium Industry*, and K. Wefers et al., *Oxides and Hydroxide of Aluminum*, Aluminum Company of American Technical Paper, No. 19 (1972). And the specific surface ($S_{BET}$) of the ualumina particles is from 5 to 50 m²/g. As used herein, the term "α-alumina" refers to alumina containing alumina in an amount of from about 60 to 100 wt %, and alumina containing 100 wt % α-alumina is preferred.

In the magnetic layer of the present invention, α-alumina is used in an amount of from about 2 to 12 wt %, preferably from about 4 to 10 wt %, and particularly from about 4 to 8 wt %, based on the ferromagnetic particles.

In the process of preparing a magnetic recording medium of the present invention, α-alumina particles are added upon preparation of a magnetic coating composition comprising ferromagnetic fine particles, a binder and a solvent. A dispersing agent, a lubricating agent, an antistatic agent, carbon black and the like can also be added to the coating composition, if desired. Those additives, ferromagnetic particles, a binder and a solvent are mixed and dispersed to prepare a magnetic coating composition, which is coated, dried, and then is subjected to magnetic orientation to obtain a magnetic recording medium.

Suitable ferromagnetic fine particles include those conventionally known, such as $\gamma$-$Fe_2O_3$, Co-containing $\gamma$-$Fe_2O_3$, $Fe_3O_4$, Co-containing $Fe_3O_4$, $\gamma$-FeOx (wherein x is 1.33 to 1.5), Co-containing $\gamma$-FeOx (wherein x is 1.33 to 1.5), $CrO_2$, Fe-Mn-Zn alloy, Fe-Co-Ni-P alloy, Co-Ni-P alloy, Co-Ni-Fe-B alloy, Fe-Ni-Zn alloy, Ni-Co alloy, Co-Ni-Fe alloy, etc. The average length in the long axis of the ferromagnetic fine particles is from about 0.09 to 0.3 $\mu$m, the specific surface ($S_{BET}$) of the ferromagnetic fine particles is from 20 to 150 $m^2$/g, and the ratio of average length in the long axis (axis length)/average length in the short axis (axis width) of particles is generally about 1/1 to 50/1 and preferably from 4/1 to 15/1.

Suitable dispersing agents include fatty acid having from 10 to 22 carbon atoms ($R_1COOH$ wherein $R_1$ is an akyl group having from 9 to 21 carbon atoms) such as caprylic acid, capric acid, lauric acid, myristic acid, palmitic acid, stearic acid, oleic acid, elaidic acid, linolic acid, linolenic acid or stearol acid; alkali metal (e.g., Li, Na, K, etc.), alkali earth metal (e.g., Mg, Ca, Ba, etc.), or metal such as Cu or Pb soaps,of the above fatty acid; and lecithin. Additionally, higher alcohols having 10 or more carbon atoms and sulfates and phosphates thereof can be also used. These dispersing agents are added in a ratio of generally from about 0.05 to 20 parts by weight and preferably from 0.1 to 3 parts by weight, based on 100 parts by weight of ferromagnetic particles.

Suitable lubricating agents include silicon oil; graphite; molybdenum disulfide; boron nitride; graphite fluoride; an alcohol fluoride; a polyolefin (polyethylene wax, etc.); a polyglycol (polyethylene oxide wax, etc.); an alkyl phosphate; a polyphenylether; tungsten disulfide; fatty acid esters composed of monobasic fatty acids having from 10 to 20 carbon atoms, and at least one alcohol selected from monohydric alcohol or dihydric alcohol and trihydric alcohol, tetrahydric alcohol or hexahydric alcohol; and fatty acid esters composed of a monobasic fatty acid having 10 or more carbon atoms and a monohydric to hexahydric alcohol in which total carbon atoms of the ester are from 11 to 28. Additionally, fatty acid having from 8 to 22 carbon atoms, fatty acid amides or aliphatic alcohols can be also used. These lubricating agents are used in an amount of generally from about 0.05 to 20 parts by weight and preferably from 0.1 to 3 parts by weight, based on 100 parts by weight of the binder.

Suitable antistatic agents include electroconductive particles such as graphite, carbon black, carbon black graft polymers, etc.; natural surface active agents such as saponin; nonionic surface active agents such as an alkylene oxide type agent, a glycerin type agent, a glycidol type agent, polyhydric alcohols, polyhydric alcohol esters or alkylphenol EO (ethylene oxide) adduct products; cationic surface active agents such as higher alkylamines, cyclic amines, hidantoin derivatives, amidoamines, esteramides, quaternary ammonium salts, pyridine and other heterocyclic compounds, phosphoniums or sulfoniums; anionic surface active agents such as carboxylic acid, sulfonic acid, phosphoric acid, or compounds having an acid group such as a sulfate group or phosphate group; and amphoteric surface active agents such as amino acids, aminosulfonic acids, sulfates or phosphates of the aminoalcohol or akylbetaine type agents.

Suitable binders include conventionally known thermoplastic resins, thermosetting resins, reactive type resins and mixtures thereof.

Suitable thermoplastic resins are those having a softening point of about 150° C. or lower and preferably from about 50° to 100° C., an average molecular weight of from about 2,000 to 300,000 and preferably from about 30,000 to 150,000, and a degree of polymerization of about 10 to 2,000 and preferably from about 200 to 600, such as copolymers of vinyl chloride and vinyl acetate, copolymers of vinyl chloride and vinylidene chloride, copolymers of vinyl chloride and acrylonitrile, copolymers of acrylate and acrylonitrile, copolymers of acrylate and vinylidene chloride, copolymers of acrylate and styrene, copolymers of methacrylate and acrylonitrile, copolymers of methacrylate and vinylidene chloride, copolymers of methacrylate and styrene, urethane elastomers, nylon and silicon type resins, nitrocellulose and polyamide resins, polyvinyl fluoride, copolymers of vinylidene chloride and acrylonitrile, copolymers of butadiene and acrylonitrile, polyamide resins, polyvinyl butyral, cellulose derivatives (cellulose acetate butyrate, cellulose diacetate, cellulose triacetate, cellulose propionate, nitrocellulose, etc.), copolymers of styrene and butadiene, polyester resins, copolymers of chlorovinyl ether and acrylate, amino resins, various synthetic rubber type thermoplastic resins and mixtures thereof. Among these, copolymers of vinyl chloride and vinyl acetate are preferred.

Suitable thermosetting resins and reactive type resins are those having a glass transition temperature of about 150° C. or lower and preferably from about 50° to 100° C., an average molecular weight of from about 2,000 to 300,000 and preferably from about 30,000 to 150,000, and a degree of polymerization of about 10 to 2,000 and preferably from about 200 to 600.

Those binders are used alone or in combination and can further contain various conventional additives. The binder is used in a ratio of from about 5 to 300 parts by weight and preferably from about 15 to 35 parts by weight, based on 100 parts by weight of ferromagnetic fine particles.

The organic solvents used for dispersing, mixing, kneading and coating the magnetic layer composition include ketones such as acetone, methyl ethyl ketone, methyl isobutyl ketone, cyclohexanone, isophorone or tetrahydrofuran; alcohols such as methanol, ethanol, propanol, butanol, isobutyl alcohol, isopropyl alcohol, or methylcyclohexanol; esters such as methyl acetate, ethyl acetate, butyl acetate, isobutyl acetate, isopropyl acetate, ethyl lactate, or monoethyl ether glycol acetate; glycol ethers such as ether, glycol dimethyl ether, glycol monoethyl ether or dioxane; tars (aromatic hydrocarbons) such as benzene, toluene, xylene, cresol, chlorobenzene or styrene; chlorinated hydrocarbons such as methylene chloride, ethylene chloride, carbon tetrachloride, chloroform, ethylene chlorohydrin or dichlorobenzene, N,N-dimethylformaldehyde and hexane.

Carbon blacks which can be used in the present invention are those having a particle size of generally from about 10 to 500 m$\mu$, preferably from about 10 to 100 m$\mu$, and particularly preferably from about 10 to 50 m$\mu$, and a specific surface ($S_{BET}$) of generally from about 1 to 1,000 m$^2$/g, preferably from about 10 to 700 m$^2$/g, and particularly preferably from about 50 to 400 m$^2$/g.

Mixing and kneading methods are not limited and the order of adding each ingredient can optionally be determined. A generally used mixing and kneading device is used for preparation of a magnetic coating composition such as a two roll mill, a three roll mill, a ball mill, a pebble mill, Trommel, a sand grinder, a Szegvari, an attritor, a high speed impeller, a dispersing machine, a high speed stone mill, a high speed impact mill, Disperser, a kneader, a high speed mixer, a ribbon blender, a cokneader, an intensive mixer, a tumbler, a blender, a disperser, a homogenizer, a single axial screw extruding device, a biaxial screw extruding device and an ultrasonic dispersing device.

A magnetic recording layer is prepared by dissolving the above described compositions and an optional organic solvent, coating the resulting coating solution on a support and drying it. When a magnetic recording layer is used as a tape, the thickness of the support is from about 2.5 to 100 $\mu$m, preferably from about 3 to 70 $\mu$m. When the magnetic layer is used as a disk or a card, the thickness of the support is from about 0.5 to 10 mm. When the magnetic layer is used as a drum, a cylindrical form can be used. Materials for the support include polyesters such as polyethylene terephthalate or polyethylene naphthalate, polyolefins such as polypropylene, cellulose derivatives such as cellulose triacetate or cellulose diacetate, vinyl type resins such as polyvinyl chloride, plastics such as polycarbonate, polyamide or polysulfone, metals such as aluminum or copper, and ceramics such as glass. Prior to coating, those supports can be subjected to corona discharge treatment, plasma treatment, undercoating treatment, heat treatment, dust and contaminant removing treatment, metal vapour deposition treatment or alkali treatment.

The methods for coating the magnetic recording layer on a support include an air doctor coating method, a blade coating method, an air knife coating method, a squeeze coating method, an dip coating method, a reverse roll coating method, a tranfer roll coating method, a gravure coating method, a kiss coating method, a cast coating method and a spray coating method, and other coating methods can be also used. A detailed description of these methods is disclosed in *Coating Kogaku (Coating Engineering)*, Asakura Shoten, pp. 253–277 (Mar. 20, 1971).

The thus prepared magnetic layer provided on a support is subjected to magnetic orientation, if desired, while being dried, and the thus formed magnetic layer is dried. The speed for carrying a support is generally from about 10 m/min. to 500 m/min. The drying temperature is adjusted to about 20° C. to 120° C. If desired, the layer is subjected to surface smoothing treatment, and the material is cut to a desired shape to obtain a magnetic recording medium of the present invention.

When a magnetic recording medium is used as a magnetic tape, a backing layer can be provided on the surface of the non-magnetic support opposite to the magnetic layer to reduce the friction coefficient. A backing layer can contain an inorganic pigment such as carbon black and a binder.

The present invention is now illustrated in more detail with reference to specific Examples, but the present invention is not to be construed as being limited to the following Examples. In the Examples, all parts, percents and ratios are by weight, unless otherwise indicated.

EXAMPLE 1

The following ingredients were put in a ball mill, sufficiently mixed and kneaded, and thereafter 10 parts of Desmodule L-75 (a trade name of a polyisocyanate compound (molecular weight: 656) manufactured by Bayer Co., Ltd.) was added thereto, mixed and dispersed homogeneously to obtain a magnetic coating composition.

| | |
|---|---|
| Co-containing $\gamma$-Fe$_2$O$_3$ particles (nitrogen adsorption specific surface area: 40 m$^2$/g) (particle Hc (coercive force) = 850 Oe) | 300 parts |
| Copolymer of vinyl chloride and vinyl acetate ("VMCH," manufactured by Union Carbide Co., Ltd.) (degree of polymerization: 450) | 15 parts |
| Polyurethane ("Nippollan N2304," manufactured by Nippon Polyurethane Co., Ltd.) (molecular weight: 70,000) | 50 parts |
| Carbon black (average particle size: 10 m$\mu$) | 20 parts |
| $\alpha$-alumina | x parts (shown in the table) |
| Lecithin | 3 parts |
| Oleic acid | 3 parts |
| Octyl laurate | 3 parts |
| Lauric acid | 3 parts |
| Butyl acetate | 600 parts |
| Methyl ethyl ketone | 300 parts |

The viscosity of the resulting coating composition was adjusted and the coating composition was coated on the surface of a polyethylene terephthalate support, subjected to magnetic orientation and dried to prepare samples.

The following ingredients for a backing layer were put in a ball mill, mixed and kneaded, and thereafter parts of "Collonate 2061" (a trade name of a polyisocyanate manufactured by Nippon Polyurethane Co., Ltd.) was added thereto, mixed and dispersed homogeneously and the resulting dispersion was coated to obtain the backing layer having a thickness of 2 $\mu$m on the surface of the support opposite to a magnetic layer and dried.

| | |
|---|---|
| Carbon black ("Raven MTP", a trade name, manufactured by Columbian Co., Ltd.) (average particle size: 250 m$\mu$) | 100 parts |
| Polyurethane ("Nippollan-2304", a trade name, manufactured by Nippon Polyurethane Co., Ltd.) (molecular weight: 70,000) | 30 parts |
| Saran resin (manufactured by Dow-Chemical Co., Ltd.) | 30 parts |
| Copper oleate | 0.1 part |
| Methyl ethyl ketone | 1000 parts |
| Cyclohexanone | 200 parts |

The thus-prepared tape was subjected to mirror surface treatment by calendering and then slit to 1-inch widths to prepare a sample.

The other samples were prepared according to the above manner using magnetic coating compositions containing aluminas A, B, C, D, and E alone or in combination as shown in the table. The properties of these aluminas are shown in the table.

TABLE

| Sample No. | Alumina | Additive amounts (parts) | Vicosity | Gloss value | S/N after 1 pass and after 100 passes (dB) |
|---|---|---|---|---|---|
| 1* | — | — | 52 p | 160 | 0 → −1.8 |
| 2 | Alumina A<br>0.05–0.4 μm<br>(100 particles)<br>0.05 μm or less<br>(7 particles)<br>x̄ = 0.22 μm<br>Sb = 9.5 m²/g | — | 18 | 61 p | 162 | +0.2 → +0.2 |
| 3* | Alumina B<br>0.05–0.4 μm<br>(90 particles)<br>0.05 μm or less<br>(360 particles)<br>x̄ = 0.18 μm<br>Sb = 9.5 m²/g | — | 18 | 85 p | 150 | −0.5 → −0.4 |
| 4 | Alumina C<br>0.05–0.4 μm<br>(100 particles)<br>0.05 μm or less<br>(2 particles)<br>x̄ = 0.18 μm<br>Sb = 9.5 m²/g | — | 18 | 55 p | 155 | +0.1 → +0.1 |
| 5 | Alumina A<br>0.05–0.4 μm<br>(100 particles)<br>0.05 μm or less<br>(7 particles)<br>x̄ = 0.28 μm<br>Sb = 9.5 m²/g | Alumina D<br>0.1–1.0 μm<br>(100 particles)<br>0.05 μm or less<br>(0 particles)<br>x̄ = 0.52 μm<br>Sb = 5 m²/g | 18/4 | 52 p | 159 | 0 → +0.2 |
| 6 | Alumina E<br>0.05–0.4 μm<br>(78 particles)<br>0.05 μm or less<br>(20 particles)<br>x̄ = 0.22 μm | Alumina D<br>0.1–1.0 μm<br>(100 particles)<br>0.05 μm or less<br>(0 particles)<br>x̄ = 0.52 μm<br>Sb = 5 m²/g | 18/6 | 53 p | 160 | +0.2 → +0.2 |

*Comparative Examples

In the table, the average particle size and particle size ranges were measured by an electron-microscope. Sb stands for the specific surface area obtained by a nitrogen adsorption method.

When a magnetic coating composition has a higher viscosity, the magnetic layer containing it generally has higher gloss. However, as shown in Comparative Example 3, when a large number of small alumina particles, i.e., 360 alumina particles having a particle size of 0.05 μm or less are present, viscosity is increased and gloss value is not increased.

The gloss value was measured by a method according to JIS Z 8741-1959 (at a temperature of 45° C.), and the viscosity was measured by a B type viscosimeter.

In accordance with the present invention, the dispersibility of α-alumina as an abrasive agent in the magnetic layer can be improved, thereby improving the S/N (signal to noise) ratio of the magnetic recording medium, while maintaining sufficient wear resistance.

As shown in Example 1, when an abrasive agent was not used, the S/N ratio changed significantly between first pass and the hundredth pass. In contrast, when α-alumina of the present invention was used, the S/N ratio did not change. Furthermore, when a large number of small α-alumina particles were present, the S/N ratio were not improved. A magnetic recording medium having improved gloss can be obtained by the use of α-alumina of the present invention.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a magnetic layer comprising ferromagnetic fine particles, a binder, and α-alumina particles having an average size of from about 0.1 to 0.3 μm, provided that the number of α-alumina particles having a particle size of from 0.05 μm to 1.0 μm is at least equal to the number of α-alumina particles having a particle size of up to 0.05 μm, wherein the α-alumina particles have a specific surface area of from 5 to 50 m²/g and the amount of the α-alumina particles is from about 2 to 12 wt % based on the ferromagnetic fine particles.

2. The magnetic recording medium as claimed in claim 1, wherein the number of α-alumina particles having a particle size of from 0.05 μm is at least twice the number of α-alumina particles having a particle size of up to 0.05 μm.

3. The magnetic recording medium as claimed in claim 2, wherein the number of α-alumina particles having a particle size of from 0.05 μm to 1.0 for is at least three times the number of α-alumina particles having a particle size of up to 0.05 μm.

4. The magnetic recording medium as claimed in claim 1, wherein said α-alumina particles comprise from 60 to 100 wt % of α-alumina.

5. The magnetic recording medium as claimed in claim 4, wherein said α-alumina particles comprise about 100 wt % of α-alumina.

6. The magnetic recording medium as claimed in claim 1, wherein said binder is present in an amount of from about 5 to 300 parts by weight per 100 parts by weight of said ferromagnetic fine particles.

7. The magnetic recording material as claimed in claim 6, wherein said α-alumina particles are present in an amount of from about 4 to 10 wt % based on said ferromagnetic fine particles.

8. The magnetic recording medium as claimed in claim 1, wherein said ferromagnetic fine particles have an average length in the long axis of from 0.09 to 0.3 μm.

9. The magnetic recording medium as claimed in claim 1, wherein said binder is a thermoplastic resin, a thermosetting resin, a reactive resin, or mixture thereof.

10. The magnetic recording medium as claimed in claim 9, wherein said binder is a thermoplastic resin having a softening point of up to about 150° C., an average molecular weight from about 2,000 to 300,000, and a degree of polymerization of about 10 to 2,000.

* * * * *